United States Patent Office 3,020,585
Patented Feb. 13, 1962

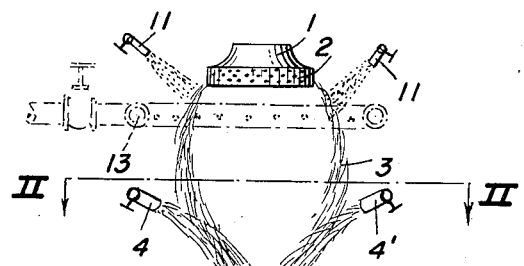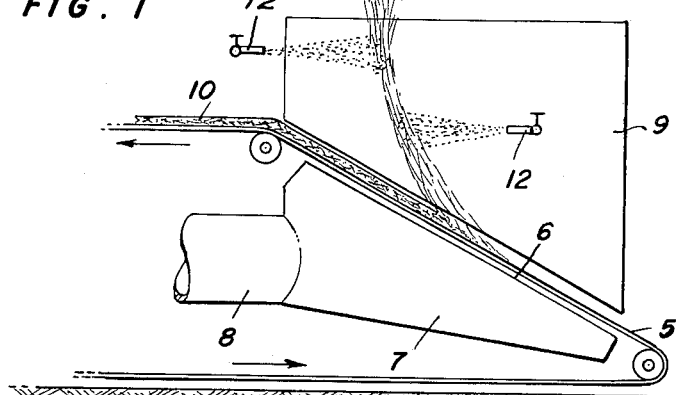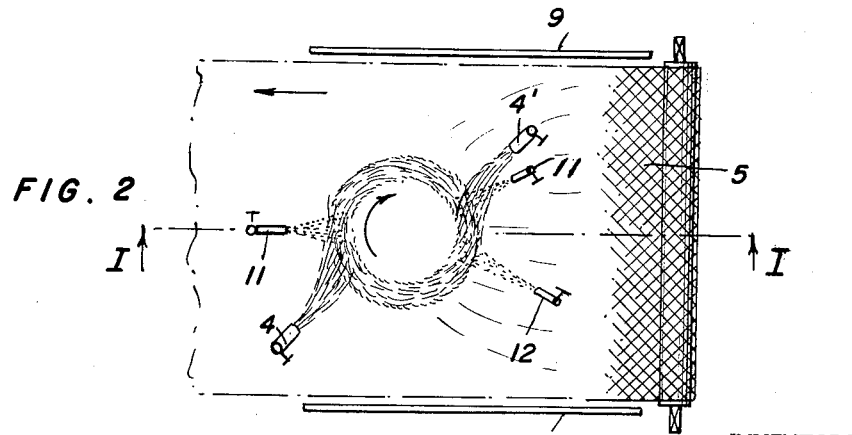

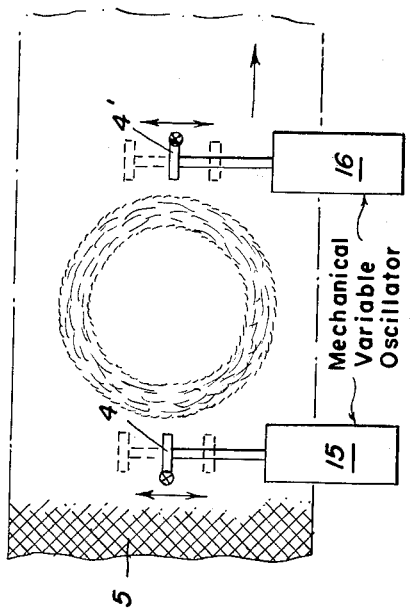
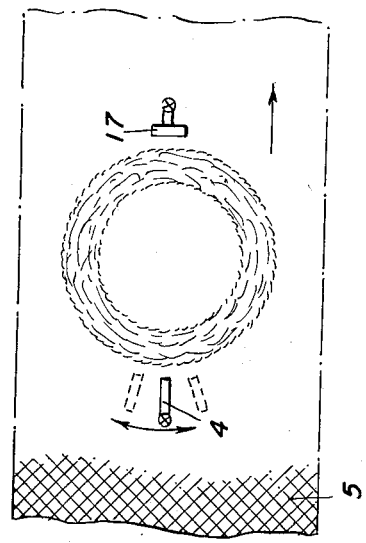
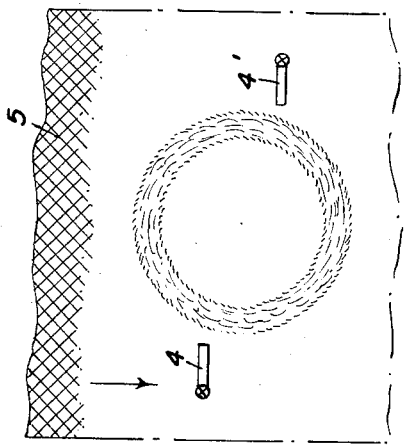
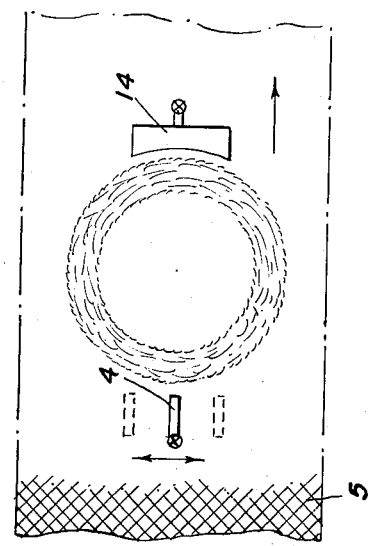

3,020,585
PROCESS AND APPARATUS FOR THE MANUFACTURE OF FIBER LININGS OR MATS
Lucien Berthon, Liancourt, Marcel Levecque, Saint-Gratien, and Paul Piot, Deuil, France, assignors to Societe Anonyme des Manufactures des Glaces & Produits Chimiques de Saint-Gobain, Chauny & Cirey, Paris, France, a corporation of France
Filed May 6, 1957, Ser. No. 657,229
Claims priority, application France May 15, 1956
15 Claims. (Cl. 18—2.5)

The present invention relates to the process and apparatus for the manufacture of fiber linings or mats, particularly from glass and other similar materials.

An object of the present invention is to produce sheets or layers of loose fibers arranged in substantially parallel relationship axially aligned with the length of the sheet, as it is formed in a continuous process, the fiber material such as glass being melted and passed horizontally through small perforations in a peripheral centrifuge wall to form the fibers. The resultant fibers are directed downwardly in the form of an annular column or curtain which is collapsed and spread out in a substantially flattened layer or mass, as they drop over a conveyor to produce a continuous, substantially uniform layer or mat across the width of the conveyor.

A further object is to provide apparatus for forming a multiplicity of fine fibers of glass or the like by centrifugally ejecting the molten material through a perforated peripheral wall of a vessel rotated at high speed, while the molten mass is delivered to said vessel through a central opening at the top. Gas blowing nozzles appropriately spaced around and below the vessel to guide the fall of the fibers in column or annular form and to divert and distribute these fibers into a flat curtain of substantially uniform thickness, and a slowly moving conveyor belt substantially of the same width as this curtain for receiving it to form a homogeneous and continuous pad or mat of fibers all arranged substantially parallel to said belt.

A further object is to provide in the above apparatus a perforated or screen belt on the conveyor, moving on an incline upwardly in the region where the curtain meets it so as to receive the delivered fibers tangential to its surface or at a small or acute angle thereto, and blower nozzles directed against the lower portion of said curtain in the direction of motion of the conveyor belt at a sufficient rate to urge the successive fibers in the flat curtain, as they strike the conveyor, to flatten forwardly against the previously fallen layers in a continuously overlapping relation on top of the screen belt.

Provision is made for a suction box closely spaced under the inclined belt portion in the region where the curtain of fibers is collected on the belt, so as to assist in urging the fibers to turn flat against the screen in overlying manner as the successive fibers reach the screen belt by diverting the air streams normally to the screen as they approach it and pass through between the deposited fiber layers, the rate of fiber supply and the rate of movement of the conveyor belt being adjusted to provide the desired thickness of the mat of fibers continuously delivered by the conveyor.

The invention contemplates an arrangement of deforming and converting jets directed substantially in a radial plane inclined vertically downward against the peripheral umbrella of fibers issuing from the centrifuge, so as to provoke the deformation of the annularly whirling curtain as it falls and convert the same gradually into a substantially flat sheet or pad of fibers and to carry the edges of the flat fiber sheet toward the guide walls at the sides of the conveyor and to extend the flattened sheet into a substantially uniform mass across the width of the conveyor as the flattened curtain of fibers approaches the belt, while maintaining the fibers continuously in substantially parallel relation in line with the falling curtain. By inducing greater falling speed in the curtain as it falls, flocking of the fibers is avoided at any point.

A further object is to provide a process or method of making a substantially homogeneous lining or sheet of fibers of glass or the like by producing a substantially close multiplicity of molten fibers by centrifugal extrusion, guiding the fibers downwardly in an annular curtain over a conveyor belt, drawing out these fibers and increasing their speed of fall to prevent flocking, directing gaseous currents against the annular curtain to deform and convert the annular curtain of fibers and to contribute eventually in the formation of the resultant current which draws out the fibers to form a substantially flat sheet of fibers and carry it to the conveyor system with an acceleration greater than that of gravity.

It is also contemplated to include in this process, the blowing of other gaseous currents against the curtain in such manner as to deform and convert the annular curtain into a flat curtain, the edges thereof forming the outer edges of the flat portion of falling fibers as they reach the conveyor.

A further step in the process is to receive the flat curtain of fibers on a horizontal or inclined receiving conveyor system in such a way that the fibers, maintaining parallel relations among themselves in the current which draws them at high speed toward the conveyor system, arrive on this system substantially tangentially or at an acute angle thereto, and continue their parallel relations in the lining or mat formed continuously on the traveling conveyor system.

One jet of gaseous fluid may be used for initiating the deformation and conversion of the annular curtain into a flat curtain, and other more dispersed jets of air or gas utilized for aiding the conversion of the annular curtain into a transverse substantially flat curtain and drawing it downwardly at an increased rate as it approaches the conveyor. The jets may be arranged symmetrically on both sides of the median line of the conveyor in a plane normal to the axis of the rotating body or centrifuge to facilitate the uniform disposition of the flat curtain across the conveyor.

The required directional conversion of the annular curtain into the transverse and substantially flat curtain toward the conveyor can be aided by means of a reciprocating jet inclined downwardly at one or both sides of the annular curtain, having a linear axially horizontal stroke or an arcuate horizontal stroke with respect to the annular curtain, in either case maintaining the gas stream within range of the curtain, and adjusting the amplitude and speed of said strokes.

It is feasible to use a series of aligned jets or a flattened jet extending horizonally on one or both sides of the annular curtain to obtain proper conversion to a substantially flat curtain, these jets being also preferably inclined downwardly.

It is desirable to provide pressure controls for the several jets, say by means of valves, to regulate their pressures uniformly or to relatively different pressures, providing even negative pressures or suction at some locations if desired to induce a counter flow of the air current at such locations.

An additional blowing element may be utilized between the centrifuge and the nozzles producing the gaseous currents, said element being arranged in the form of a ring and aimed at increasing the speed of the fibers before subjecting them to conversion from the annular form to a substantially flat curtain.

Regulation of the distribution of the fibers on the conveyor system is desirable and this is accomplished by controlling the orientation of the blowing nozzles producing the gaseous currents, the number of such nozzles, or the pressure and volume of the respective nozzles in any desired combinations.

It is within the scope of the invention to employ auxiliary methods such as devices for sizing the fibers, by means of sizing jets interposed between the centrifuge and the conveyor as an aid in preventing flocking.

Other and more specific objects of this invention will become apparent in the following detailed description of preferred systems, as shown in the accompanying drawings for purposes of illustration wherein:

FIG. 1 represents an arrangement of apparatus which may be used to carry out the processes of the present invention, in axially sectional elevation taken on the line I—I of FIG. 2.

FIG. 2 is a sectional plan view taken on the line II—II of FIG. 1.

FIGS. 3 to 6 are similar plan views showing various arrangements and types of nozzles for the gas jets which may be used.

In the device in FIGS. 1 and 2, the fiber and mat producing system is represented schematically and embodies essentially a rotating body 1, the peripheral wall 2 of which is provided with perforations through which the melted material introduced into this body, is extruded by centrifugal action in the form of thin filaments. Fibers 3 resulting from drawing out these filaments pass between a series of gas jets, two of which, 4 and 4', are illustrated in the example shown. These blowing jets are arranged so that the gaseous currents delivered thereby are directed at an angle downwardly and act on the annular curtain of fibers to induce deformation and conversion of the annular curtain into a flat mat of fibers without disruption or breaking of the fibers. The blowing jets may be set at angles up to 70° with respect to the axis of rotation of the centrifuge. The jets are oriented in the direction of rotation of the centrifuge, see FIG. 2. In addition, their action is such that the annular curtain is converted into sheet form and takes a direction so that it arrives tangentially or at a small or acute angle at conveyor belt 5 in the form of a substantially flat curtain.

A conveyor belt 5, moving in the direction of the arrow, is formed by a lattice or perforated ribbon and passes between guide walls 9, over an opening 6 of a hood 7 in communication with a suction pipe 8 connected with a source of vacuum, not shown. This belt may be inclined, for example 30° to the horizontal, in the section where it receives the fibers, the latter thus arriving substantially parallel to the belt or at an acute angle thereto, to form a continuous sheet or mat 10 on the belt.

In the form of the apparatus illustrated, sizing nozzles 11 and 12 have been provided, placed respectively between the centrifuge and the gas blowing jets 4—4' and between these latter and the conveyor belt 5 as shown in FIG. 1.

There can also be provided a blowing ring or annular nozzle 13 (represented by broken lines in FIG. 1), designed to project against the fibers a current of compressed air for the purpose of entraining and accelerating the falling speed of the fibers projected from the centrifuge.

The gas blowing jets 4 and 4' may be arranged on pivoted supports so as to be able to regulate at will the directions of the gas currents produced thereby, and thus control the distribution of the fibers on the conveyor. The jets may have a circular cross-section or a flat section. According to the device shown in FIG. 3, the blowing jets 4 and 4', are located in planes parallel to a plane passing through the axis of the curtain and perpendicular to the direction of movement of the conveyor belt 5 which is shown moving in the direction of the arrow. Here the jets are stationary, and are arranged symmetrically with respect to the axis of rotation of the rotating body 1, in parallel planes on opposite sides of said axis, and the gaseous currents that they deliver are slightly displaced from said axis of rotation. It is preferable that this displacement be less than ¾ of the radius of the annular curtain in the plane normal to the axis containing the point of contact of the jet current and of the annular curtain.

In the device shown in FIG. 4, the gas blowing nozzles 4 and 4' are moved in the alternate oscillations as shown by double arrows by any suitable means for example mechanical oscillators 15 and 16. The amplitude of this motion is small enough for the jets produced by these nozzles to remain within the range of effective contact with the annular curtain. In the intermediate position of the blowing nozzles, as shown in full lines in FIG. 4 of the drawing, the axis of these jets passes through the axis of rotation of the curtain, and they are inclined in the longitudinal direction of the receiving belt 5 which moves in the direction indicated by the arrow. Such a device using gas jets set in motion by an alternating oscillatory movement makes possible further improvement in the homogeneity of the distribution of the fibers forming the flat mat on the receiving belt 5.

The alternating oscillatory movement of the blowing nozzles may be uniform or variable and may be effected by a rectilinear translation, FIG. 4, or an arcuate movement, FIG. 6, about the axis of the curtain. The oscillatory movements of the blowing nozzles may be of the same phase or suitably out of phase and these nozzles may be simultaneously or independently controlled.

The frequency of oscillations is preferably 20 to 500 per minute. Applicants have observed particularly satisfactory results were obtained with 60 oscillations per minute.

In the device shown in FIG. 5, there is utilized a blowing nozzle 4 set in motion by an oscillatory movement as in the case of FIG. 4, but the blowing nozzle 4' is replaced by stationary blower 14, with a flat section, whose length is practically equal to the amplitude of movement of blowing nozzle 4. This device is especially useful for low gas current speeds used to draw out and carry along the fibers.

In the device of FIG. 6 the oscillating blower 4 is constantly directed toward the axis of rotation of the body 1 during its oscillations. The blower 17 is stationary and carries a slightly flattened section.

While this process of making glass fiber layers in a continuous manner, as described, may be carried out by the apparatus shown, it may also be carried out by other forms of apparatus and is not limited to the specific form and arrangement of parts here disclosed. On the other hand, the form of apparatus shown may be used to carry out other processes by a different selection of gas pressures, nozzles, relative speeds of the several jets, etc.

Various characteristics of the present process and apparatus which may be noted appear as follows:

The annular curtain of fibers is formed by centrifugal extrusion of the molten substance through a peripheral perforated wall of a high speed centrifuge rotating on a vertical axis. The umbrella of finely extruded filaments of the molten material is guided downwardly partly by gravity and may be assisted by gas blowers to maintain an annular curtain of fibers which are entrained, drawn out and accelerated downwardly. Downwardly inclined jets of gas are directed against the annular curtain of fibers in such a way as to deform the downwardly moving annular curtain and convert it gradually as it falls with continuously increasing speed into a substantially flat curtain spread substantially uniformly across the width of the conveyor where it arrives tangentially thereto or at an acute angle to the surface of the belt. At least some of the gas jets are such as to induce deformation of the annular curtain of fibers and convert the same into a flat ribbon or mat of fibers and prevent flocking of the fibers, the fibers maintaining a mutually substantially parallel relationship throughout the annular curtain and flat mat in line with the downward movement thereof toward the conveyor belt. As the successive fibers of the flat mat strike the moving belt, they are flattened and turned in the direction of the previously deposited fibers thereon by the downwardly flowing gas currents which may escape through the screen belt on which the resulting layers of fibers are continuously formed as the conveyor belt moves on its way to deliver a substantially even homogeneous sheet of the fiber lining or mat.

The amount of overlap of the fibers and the thickness of the resulting layer or mat may be controlled by the speed of movement of the conveyor belt relative to the volume of the falling fiber curtain.

The gases with the entrained fibers forming the annular gaseous current are kept at a speed which remains superior to the speed of aspiration of the gases through the conveyor and should not fall under a certain value. If the speed of the gases of the annular curtain were too low, an agglomeration of the fibers would be provoked with the result that an undesirable mat would be collected on the conveyor. Since the fibers constituting the annular and flat curtain are maintained in substantially parallel relation in the direction of their travel, there is no tendency of the fibers to disperse anywhere in their path of travel.

The fineness of the fibers may be regulated in the first instance by the size of the perforations in the centrifuge wall as well as its speed of rotation, and by regulating the extent to which they are later drawn out during their accelerated fall induced by the downwardly directed gas jets.

The final flattening against the reticulated belt or conveyor is assisted by providing suction under the belt, as heretofore described, to provide a pressure differential across the belt in the region of the reception of the fiber lining or mat, and to carry away the gas currents passing downwardly therethrough. The guide walls 9 may extend upwardly from the sides of fiber receiving portion of the conveyor belt to contain the spreading curtain of fibers and the gas currents as they approach the belt. The finished continuous mat of fibers delivered by the conveyor is shown at 10.

Modifications in the form and arrangement of parts of the apparatus as well as in the steps of the process may be made without departing from the spirit and scope of this invention, as defined in the appended claims.

What is claimed is:

1. A process of producing continuous lengths of fiber linings or mats of glass and similar materials comprising centrifugally extruding fibers of molten material to form a curtain of fibers in the form of a continuous tube, guiding said tube downwardly in an annular curtain around a substantially vertical axis, with the aid of gas currents to accelerate its falling speed, deforming said annular curtain at at least one point in its periphery by an impinging jet of gas, spreading said annular curtain to a substantially flat curtain under the influence of said jet of gas with substantially no movement of the aixs thereof transversely to the length of the mat, and depositing said flat curtain of fibers onto a moving conveyor belt in the form of a continuous mat of overlapping substantially parallel fibers.

2. A process as defined in claim 1, and guiding said flat curtain to strike the moving belt at an acute angle in the direction of belt movement, whereby the downwardly directed gas curents will flatten the fibers against the belt in overlapping relation to form said linings.

3. A process as defined in claim 2, and moving the fiber receiving portion of said conveyor belt in a slightly upwardly inclined direction to the horizontal to facilitate the reduction of said acute angle and assure flattening of the fibers against said belt in parallel overlapping relation.

4. A process as defined in claim 2, using a screen belt on said conveyor, and applying suction under its fiber receiving portion to increase the pressure differential across the belt and facilitate flattening of the fibers thereon.

5. Apparatus for producing fiber linings or mats of glass and like materials comprising a centrifuge having a perforated peripheral wall for the extrusion of fine fibers of the molten material therethrough at high rotational speeds to form an umbrella curtain of fibers, a plurality of gas jets located on opposite sides of said curtain and movable alternately in respect to each other for delivering gaseous fluid under pressure directed against said annular curtain of falling fibers to deform and convert said curtain into a substantially flat curtain as it falls, a perforated conveyor belt to receive said flat curtain at most at an acute angle, and means to flatten said fibers against the belt as they strike it in overlapping parallel relation to form the continuous lining or mat.

6. Apparatus for producing fiber linings or mats of glass and like materials comprising a centrifuge having a perforated peripheral wall for the extrusion of fine fibers of the molten material therethrough at high rotational speeds to form an umbrella curtain of fibers, a plurality of gas jets delivering gaseous fluid under pressure directed against said annular curtain of falling fibers with at least one of the gas jets movable in alternate directions with respect to the curtain of fibers to deform and convert said curtain into a substantially flat curtain as it falls, a perforated conveyor belt to receive said flat curtain at most at an acute angle, and means to flatten said fibers against the belt as they strike it in overlapping parallel relation to form the continuous lining or mat.

7. Apparatus for producing fiber lining or mats of glass and like materials comprising a centrifuge having a perforated peripheral wall for the extrusion of fine fibers of the molten material therethrough at high rotational speeds to form an umbrella curtain of fibers, a plurality of gas jets delivering gaseous fluid under pressure directed against said annular curtain of falling fibers with at least one of the gas jets movable in a curved path in alternate directions about a portion of the curtain of fibers to deform and convert said curtain into a substantially flat curtain as it falls, a perforated conveyor belt to receive said flat curtain at most at an acute angle, and means to flatten said fibers against the belt as they strike it in overlapping parallel relation to form the continuous lining or mat.

8. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of the vertical axis of said annular curtain with respect to the longitudinal axis of the conveyor belt and at an inclination with respect thereto to act on the fibers in the same direction as that imparted thereto by the rotary movement of said centrifuge, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

9. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles displaced slightly in opposite directions from the vertical axis of said annular curtain with respect to the longitudinal axis of the conveyor belt and pointed at said curtain along lines perpendicular to said longitudinal axis, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

10. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of said curtain in the direction of the longitudinal axis of the conveyor belt with at least one of the nozzles being movable from one side of said longitudinal axis to the other side thereof, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

11. An apparatus as set forth in claim 10 including means for controlling the intensity of the blast of gases issuing from said nozzles.

12. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to from an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of said curtain in the direction of the longitudinal axis of the conveyor belt with at least one of the nozzles being movable in an arcuate path from one side of said longitudinal axis to the other side thereof, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

13. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of said curtain in the direction of the longitudinal axis of the conveyor belt with at least one of the nozzles extending in parallel to said longitudinal axis and movable rectilinearly from one side of said longitudinal axis to the other side thereof, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

14. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of said curtain in the direction of the longitudinal axis of the conveyor belt extending in parallel to said axis and each nozzle movable rectilinearly in alternate directions with respect to each other from one side of said longitudinal axis to the other side thereof, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

15. Apparatus for producing continuous lengths of fiber linings or mats of glass and like materials comprising a centrifuge rotatable about a vertical axis and having a perforated peripheral wall for the extrusion of fine fibers of the molten material therethrough at high rotational speeds to form a tubular curtain of fibers, gas blower means adjacent said centrifuge for guiding said curtain downwardly to form an annular curtain coaxial with said vertical axis and accelerating its falling speed, a perforated movable conveyor belt below said centrifuge with the longitudinal axis thereof extending in the direction of the length of fiber linings being produced, jet blowing means above said conveyor comprising at least a pair of nozzles disposed on opposite sides of said curtain in the direction of the longitudinal axis of the conveyor belt and means for controlling the intensity of the blasts of gases issuing from said nozzles, said jet blowing means adapted to collapse said annular curtain in said longitudinal direction into a substantially flat double sheet without shifting substantially the axis of the annular curtain in a transverse direction, and said conveyor belt adapted to receive said flat sheet as the same drops thereonto to form the continuous length of fiber mat thereon.

References Cited in the file of this patent

UNITED STATES PATENTS

| | | |
|---|---|---|
| 2,318,243 | McClure | May 4, 1943 |
| 2,600,843 | Bush | June 17, 1952 |
| 2,637,673 | Barnard | May 5, 1953 |
| 2,641,028 | Steele | June 9, 1953 |
| 2,736,676 | Frickert | Feb. 28, 1956 |
| 2,827,668 | Clark | Mar. 25, 1958 |
| 2,863,493 | Snow et al. | Dec. 9, 1958 |
| 2,931,422 | Long | Apr. 5, 1960 |

FOREIGN PATENTS

| | | |
|---|---|---|
| 202,877 | Australia | July 5, 1956 |
| 470,675 | Great Britain | Aug. 19, 1937 |